I. E. BARRICKLOW.
FLUID CLUTCH.
APPLICATION FILED JUNE 28, 1912.

1,088,514.

Patented Feb. 24, 1914.

2 SHEETS—SHEET 1.

Witnesses
W. H. Mulligan.
John J. McCarthy

Inventor
I. E. Barricklow.
By Victor J. Evans.
Attorney

I. E. BARRICKLOW.
FLUID CLUTCH.
APPLICATION FILED JUNE 28, 1912.
1,088,514.
Patented Feb. 24, 1914.
2 SHEETS—SHEET 2.
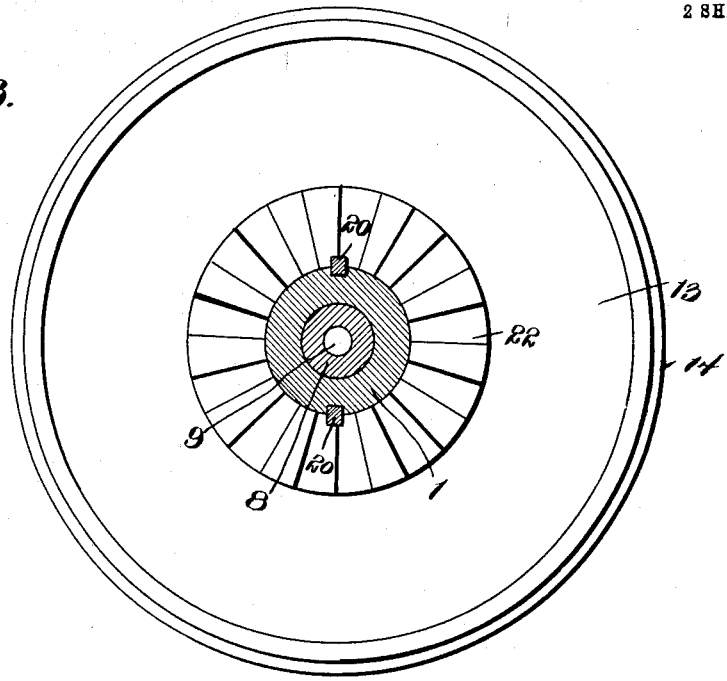
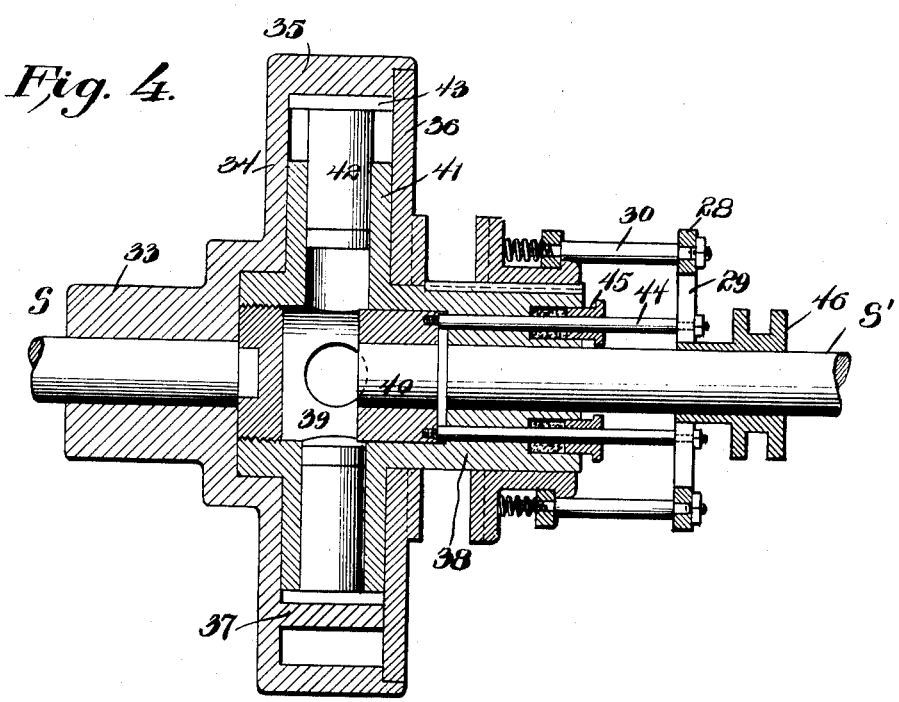
Witnesses
Wm. H. Mulligan.
John J. McCarthy
Inventor
I. E. Barricklow.
By Victor J. Evans.
Attorney

UNITED STATES PATENT OFFICE.

IRVIN E. BARRICKLOW, OF ANTIOCH, CALIFORNIA, ASSIGNOR OF ONE-HALF TO JULIAN H. OLCOVICH, OF SAN FRANCISCO, CALIFORNIA.

FLUID-CLUTCH.

1,088,514.  Specification of Letters Patent.  Patented Feb. 24, 1914.

Application filed June 28, 1912. Serial No. 706,474.

*To all whom it may concern:*

Be it known that I, IRVIN E. BARRICKLOW, a citizen of the United States of America, residing at Antioch, in the county of Contra Costa and State of California, have invented new and useful Improvements in Fluid-Clutches, of which the following is a specification.

This invention relates to improvements in fluid clutches and has particular application to clutches of this type wherein the speed of the driven member may be varied relatively to that of the driving member.

In carrying out the present invention, it is my purpose to provide a device of the class described wherein the speed of a driven member may be varied relatively to that of the driving member and by means of which the driving member may be connected directly to a driven member positively and independently of the fluid controlled means of the clutch so as to relieve the fluid controlled means when the members are revolving at the same speed, thereby prolonging the life of the clutch.

Furthermore, I aim to provide a fluid clutch whereby the speed of the driven member thereof may be varied relatively to that of the driving member and whereby the driven and driving members may be connected to each other positively and independently of the fluid controlled means immediately upon such fluid controlled means being operated to effect a direct connection between the driven and driving members, thereby relieving the fluid mechanism of the clutch of unnecessary wear and tear.

With the above and other objects in view, the invention consists in the construction, combination and arrangement of parts hereinafter set forth in and falling within the scope of the claims.

Figure 1:
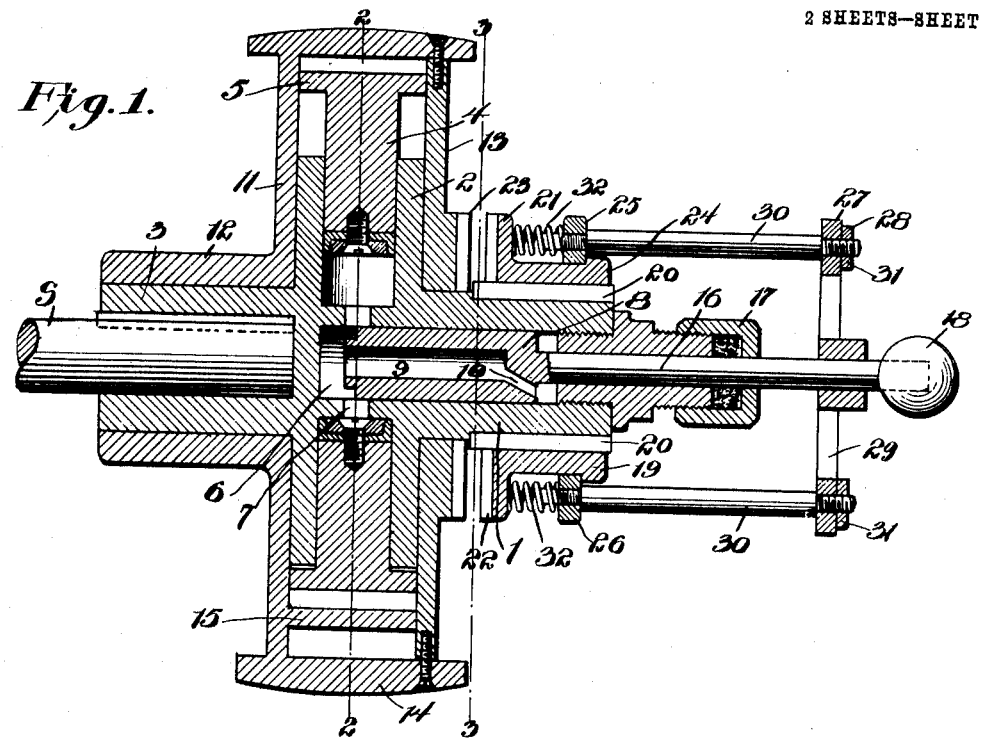
Figure 2:
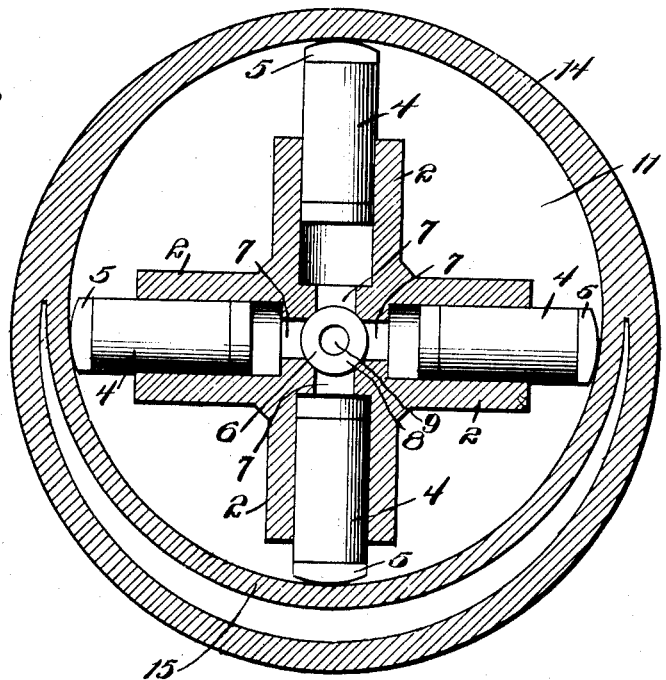

In the accompanying drawings; Figure 1 is a longitudinal sectional view of a clutch constructed in accordance with my invention, parts being shown in elevation. Fig. 2 is a transverse sectional view thereof, taken on the line 2—2 of Fig. 1 parts being shown in elevation. Fig. 3 is a similar view taken on the line 3—3 of Fig. 1, and Fig. 4 is a longitudinal sectional view of a modified form of my invention.

Referring now to the accompanying drawings in detail and particularly to Figs. 1, 2 and 3, the reference character S indicates the driving member which is connected to a suitable form of prime mover or motor and in the present instance is shown to be a shaft. Rotatable with the shaft S is the driving member of my improved clutch which member, in the present instance, consists of a hub 1 from which radiate cylinders 2 preferably formed integral therewith and with which is formed integral an axially alining sleeve 3 designed to receive the free end of the shaft S and keyed to such end of the shaft. Slidably disposed within each cylinder 2 and extending outwardly of the upper end thereof is a piston 4 terminating beyond the respective cylinder in a circumferentially enlarged friction shoe 5. The inner ends of the cylinders 2 are designed to have communication with one another and with a valve chamber 6 formed in the hub 1 and for this purpose are formed with ports 7 opening into the valve chamber, the cylinders being designed to receive a suitable quantity of fluid such, for instance, as a light oil, although it will be understood that any form of fluid may be employed in carrying my invention into practice. Slidably disposed within the valve chamber 6 is a cylindrical valve 8 formed approximately centrally with a relatively large longitudinal bore 9 and a small angular bore 10 in open communication with the bore 9 and with the rear end of the valve chamber between the rear extremity of the valve and the adjacent end wall of the chamber.

The driven member of the clutch comprises a disk 11 formed approximately centrally with a sleeve 12 loosely encircling the sleeve 3 of the driven member, and a disk 13 spaced apart from the first disk and coöperating with the first-mentioned disk to house the cylinders and pistons of the driven member, the disks being disposed at the opposite sides of such cylinders and pistons, as clearly illustrated in Fig. 1. Connecting the outer edges of the disks 11 and 13 and in the present instance, formed integral with the flange 11 is a peripheral flange 14 which in the present instance has its outer surface formed to provide a belt wheel or pulley. Arranged between the disks 11 and 13 and formed integral therewith by preference and spaced inwardly of the peripheral flange 14, is a ring 15 disposed eccentrically of the axis of the driving member of the clutch, the inner surface of such ring being engaged by the friction shoes 5 on the pistons. 16 denotes the valve actuating shaft which is preferably formed integral with the rear end of the valve and extends through the adjacent end of the valve chamber and is surrounded by a stuffing box 17, the free end of the valve actuating shaft terminating in a ball 18 adapted to be inserted within a socket member carried by a controlling lever so that the valve may be moved longitudinally of the valve chamber independently of the rotation thereof. Although I have described one particular form of joint for effecting a connection between the valve actuating shaft and the controlling lever therefor, it is to be understood that any suitable or preferred form of universal joint may be utilized at this point and for this purpose.

The above is a description of the fluid controlling mechanism of the clutch and the operation thereof is substantially as follows: Assuming the shaft S to be rotating, the driving member of the clutch embracing the cylinders, pistons and hub will rotate with such shaft, while, when the valve 9 is actuated within the valve chamber to uncover the ports 7 of the cylinders, the driven member of the clutch will remain stationary incident to the pistons being movable freely within the cylinders under the action of the friction shoes 5 engaging the eccentric ring 15. Should the valve, however, be moved to the position shown in Fig. 1, the port area of the cylinders will be reduced or restricted so that the fluid resists the reciprocating movement of the pistons within the cylinders and consequently the friction shoes of such pistons bind against the eccentric ring with the effect to rotate the driven member of the clutch, power being taken from the flange 14 by a belt or the like. In this position of the parts, the fluid within the cylinders circulates slowly from one cylinder to the other by way of the valve chamber 6 and passes through the relatively large port 9 and the small port 10 in the valve to the rear end thereof. When it is desired to effect a direct connection between the driven and driving members of the clutch, the valve is actuated to cut off communication between the cylinders and the valve chamber, thereby rendering the pistons immovable so that the friction shoes thereon bind tightly against the eccentric ring to rotate the driven member of the clutch at the same speed as that of the driving member.

In order to relieve the fluid mechanism of the clutch of unnecessary strain, when the driven and driving members are connected to rotate at the same speed, I make use of a locking means whereby the driven member may be positively locked to the driving member independently of the fluid mechanism thereby taking the strain from the fluid mechanism and prolonging the life of the same. This locking means is preferably actuated from the valve actuating shaft and subsequently to the movement of the piston to cut off communication between the piston and valve chamber and such means in the present instance, embraces an annular collar or ring 19 keyed upon the hub 1 of the driving member by means of keys 20 and adjacent to the disk 13. This collar 19 is formed with a flanged end 21 provided with teeth 22 adapted to interlock with teeth 23 formed on the confronting surface of the disk 13. The end or edge of the collar 19 opposite from the teeth 22 is formed with a flange 24 and encircling this end of the collar and in engagement with the flange 24 is an annulus 25 provided with apertures 26 suitably spaced apart and alining with apertures 27 in an annulus 28 carried by a spider 29 secured to and rotatable with the valve actuating shaft 16, studs 30 having their free ends in engagement with the apertures in the annuluses 25 and 27 respectively, suitable retaining nuts 31 being threaded onto the ends of the studs to hold the same in position. Interposed between the adjacent faces of the flange 21 and the annulus 25 and suitably spaced apart about the periphery or circumference of the collar 19, are helical expansion springs 32 acting normally to hold the annulus 25 spaced from the flange 21 and in engagement with the flange 24. By means of this construction, it will be seen that as the valve 8 is moved to restrict the port area of the cylinders, the annulus 27 will be moved inwardly with the valve actuating shaft with the effect to simultaneously move the annulus 25 and so compress the springs 32. When the valve has been moved to full closed position, the springs 32 will be contracted to such an extent as to permit the respective ends of the studs 30 to engage the flange 21 so that in the continued movement of the valve, the teeth 22 will interlock with the teeth 23 on the disk 13, thereby effecting a direct and positive connection between the driving and driven members of the clutch, immediately succeeding the cutting off of communication between the cylinders and the valve chamber.

Referring now to the modified form of my invention disclosed in Fig. 4, I have shown my invention as used in conjunction with two axially alining shafts, the driving shaft S being arranged in axial alinement with the shaft to be driven S'. In this form of my invention, the driving member of the clutch comprises a sleeve 33 keyed to the free end of the driving shaft S and formed integral with a disk 34 provided with an outwardly extending peripheral flange 35 connected at its free edge in any suitable manner to a disk 36 and holding the latter disk spaced apart from the first disk. Arranged inwardly of the flange 35 and spaced apart therefrom is a ring 37 disposed eccentrically of the axis of the driving shaft and adapted to be rotated with the shaft. The driven member of the clutch in this form of my invention comprises a hub 38 keyed upon the driven shaft S' and formed with a valve chamber 39 slidably receiving and housing the valve 40, cylinders 41 radiating from the hub 38 and being provided with ports 42 adapted to establish communication between the cylinders and the valve chamber 39 and controlled by the sliding valve 40 within the valve chamber. A piston 42 is slidably disposed within each cylinder 41 and extends outwardly of the free end of the respective cylinder and has the outer end thereof circumferentially enlarged to provide a friction shoe 43, all of such friction shoes contacting with the eccentric ring 37, the cylinders and pistons being disposed within the driving member between the disks 34 and 36 and the peripheral flange 35 thereof. The locking means for locking the driving and driven members of the clutch to each other when the cylinder ports have been closed by the valve, is substantially identical to that hereinbefore described with reference to the preferred form of my invention, and the valve 40 is connected to the spider 29 of the locking means through the medium of studs or bolts 44 disposed concentrically of the driven shaft S' and projecting through the hub 38, suitable stuffing boxes 45 surrounding the bolts 44 to avoid leakage around the parts. Connected to or formed integral with the spider 29 and splined upon the shaft S' for sliding movement is an actuating collar 46 adapted to receive the yoked end of an operating lever. The operation of this form of my invention is substantially similar to the operation of the preferred form and a brief description of the same is substantially as follows. When rotary movement is imparted to the driving shaft S, the driven member of the clutch comprising the disks 34 and 36 and the eccentric ring 37 rotate with the shaft and independently of the shaft S', when the valve is in open position, as shown in Fig. 4, this position of the valve permitting the fluid within the cylinders and valve chamber to circulate freely without offering resistance to the pistons. However, when the sliding collar 46 is actuated to impart movement to the valve 40 so as to restrict the ports 42 of the cylinders, the fluid within the cylinders, and valve chamber offers such resistance to the pistons as to bring about a binding action between the shoes 43 and the ring 37, thereby imparting movement to the shaft S', owing to the cylinders 41 being carried by the hub 38 which latter is keyed to the driven shaft. When the ports of the cylinders are completely closed, the locking means is actuated as previously described.

From the foregoing description taken in connection with the accompanying drawings, the construction, mode of operation and manner of employing my invention will be readily apparent. It will be seen that I have provided a simple, yet efficient and durable form of clutch whereby a driven member may be rotated at various speeds relative to the speed of the driving member and wherein the fluid mechanism of the clutch is relieved of the load or work when a direct connection is effected between the driven and driving members to drive the latter at the speed of the former.

While I have herein shown and described certain preferred embodiments of my invention by way of illustration and illustrated certain applications of the same, it is to be understood that I do not confine myself to all the precise details of construction herein described and delineated, as modification and variation may be made within the scope of the claims and without departing from the spirit of the invention.

I claim:

1. In a clutch including a driving member, a hub on said driving member, and a driven member comprising a pair of disks spaced apart, fluid operated means interposed between said disks and adapted to place the driving member in and out of driving engagement with said driven member, teeth formed on one of said disks, an annular collar slidably disposed upon the hub of the driving member and having a toothed flange adapted to engage the first-mentioned teeth to establish a direct connection between the driving and driven members, means controlling said fluid operated means whereby the speed of the driven member may be varied relatively to that of the driving member, an annulus surrounding said collar and adapted for sliding movement thereon, springs interposed between said annulus and the toothed flange of the collar, and connections between said annulus and said means.

2. In a clutch, a driving member, a hub on said member, a driven member comprising a pair of disks spaced apart, a plurality of cylinders fixed to said driving member between said disks and containing a fluid and provided with ports adapted to establish communication between the cylinders, pistons within the cylinders and working against the fluid therein, a ring secured to said driven member eccentrically thereof and surrounding the outer ends of the pistons and in contact therewith, means for varying the port area of the cylinders and for cutting off and establishing communication between the same whereby the speed of the driven member relatively to the driving member may be varied and the driven member placed in and out of driving engagement with the driving member, teeth formed on one of said disks, an annular collar splined on the hub of said driving member for sliding movement and provided with a toothed flange adapted to be engaged with the first-mentioned teeth, an annulus slidably disposed upon said collar, springs interposed between said annulus and toothed flange, and connections between said means and annulus whereby when the flow of fluid through the cylinders is cut off, a direct mechanical connection will be established between the driving and driven members.

In testimony whereof I affix my signature in presence of two witnesses.

IRVIN E. BARRICKLOW.

Witnesses:
H. B. DENSON,
R. G. PENDEGAST